April 4, 1961  B. E. NILSSON  2,977,620
DEVICE FOR CLEANING ROTATABLE BRUSHES, ESPECIALLY
FLOOR POLISHING MACHINE BRUSHES
Filed March 25, 1957
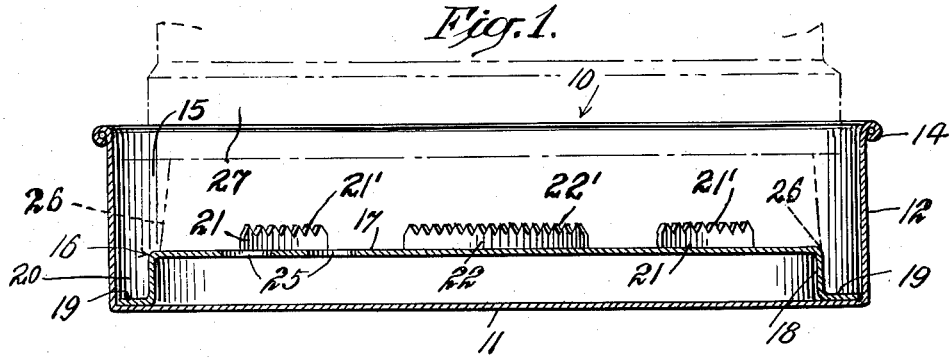
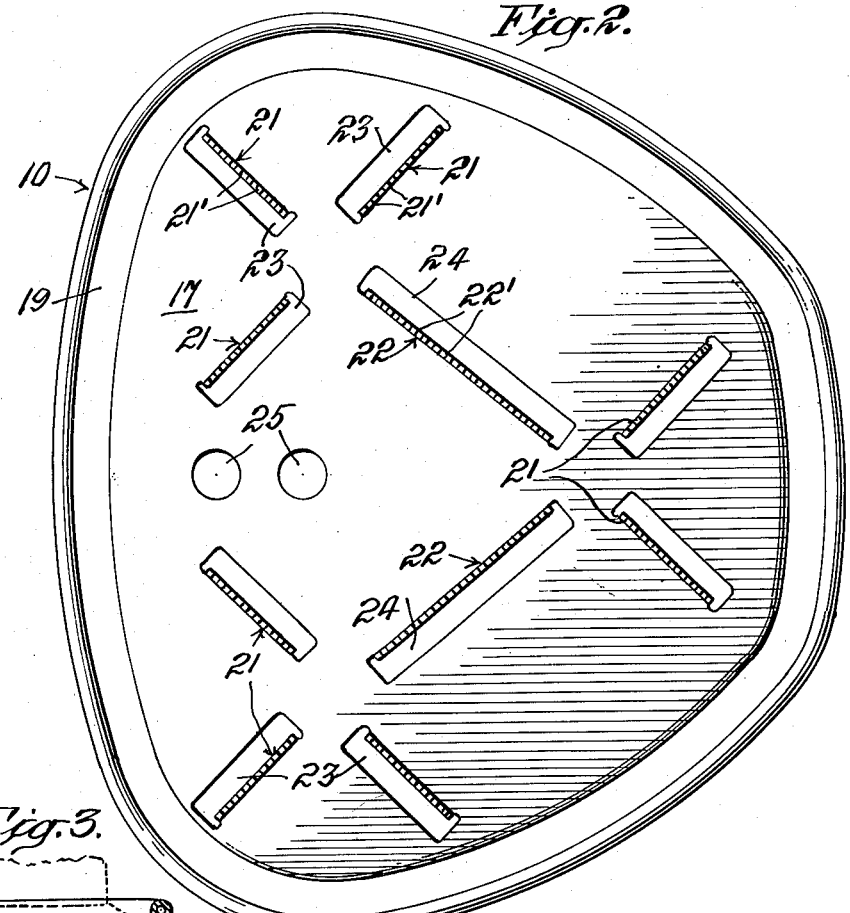
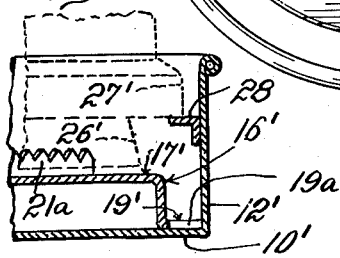
INVENTOR.
Bengt Erik Nilsson
BY
his ATTORNEY

United States Patent Office 2,977,620
Patented Apr. 4, 1961

2,977,620

DEVICE FOR CLEANING ROTATABLE BRUSHES, ESPECIALLY FLOOR POLISHING MACHINE BRUSHES

Bengt Erik Nilsson, Hagersten, Sweden, assignor to Aktiebolaget Electrolux, Stockholm, Sweden, a corporation of Sweden Filed Mar. 25, 1957, Ser. No. 648,367

Claims priority, application Sweden Mar. 29, 1956

8 Claims. (Cl. 15—142)

My invention relates to a device for cleaning brushes, and more particularly to an improved device of this kind for cleaning rotatable brushes of floor polishing machines.

The invention, together with the objects and advantages thereof, will become apparent from the following description, and the features of novelty which characterize the invention will be pointed out with particularity in the claims annexed to and forming a part of this specification.

For a better understanding of my invention, reference may be had to the following description taken in connection with the accompanying drawing, in which:

Fig. 1 is a vertical sectional view of a brush cleaning device embodying my invention;

Fig. 2 is a top plan view of the device shown in Fig. 1; and

Fig. 3 is a fragmentary vertical sectional view illustrating a modification of the invention shown in Figs. 1 and 2.

Referring to the drawing, the brush cleaning device which I have shown embodying my invention comprises an open-top vessel 10 having a bottom 11 and an upstanding side wall 12, the top edge of which is bent back upon itself, as indicated at 14, to provide a smooth surface at the vicinity of the opening 15. Disposed within the vessel 10, in an inverted position, is a shallow pan or tray 16 having a bottom 17 and a downwardly extending side wall 18 provided with an outwardly extending flange or rim 19 at the bottom edge thereof.

The bottom 17 of the pan 16 forms a raised platform in the cleaning device, and the flange or rim 19 is adapted to rest on the outer peripheral portion of bottom 11 of vessel 10 to provide a trough 20 of annular form whose outer wall is formed by the side wall 12 of the vessel 10. The platform 17 is formed with a number of upwardly extending tabs 21 and 22 pressed from the bottom of the pan 16, as by stamping, for example, slots or openings 23 and 24 thus being formed alongside of and parallel to the tabs. At the time the tabs 21 and 22 are formed, they may be provided with teeth 21' and 22', as seen in Fig. 1.

In Fig. 2 it will be seen that the tabs 21 and 22 form elongated straight cleaning members which are distributed in three zones at which the bristles of a plurality of brushes are adapted to rest during rotation of the brushes. The cleaning members 21 and 22 extend radially outward from the center regions of the three zones, the inner ends of the members being spaced from one another. Further, one cleaning member 22 at the zone at the extreme right-hand side of plate 17 in Fig. 2 forms an extension of and is integral with a cleaning member at the zone at the top part of the plate 17, and a second cleaning member 22 at the zone at the extreme right-hand side of the plate forms an extension of and is integral with a cleaning member at the zone at the bottom part of the plate 17.

The bottom 17 of the inverted pan or tray 16 may be provided with a pair of openings 25 which are closely adjacent to one another and serve as a finger grip to facilitate removal of the inner pan 16 from the vessel 10. If desired, the openings 25 may be formed in a depressed region of the platform 17.

In Fig. 2 it will be seen that both the vessel 10, which may be referred to as the base of the brush cleaning device, and the inverted inner pan or tray 16 are of noncircular form and approximately of trapezoidal shape to accommodate the brush or brushes 26 at the underside of a floor polisher 27, as indicated in dotted lines in Fig. 1. Although I do not wish to be limited thereto, the brush cleaning device is particularly suitable for cleaning the bristles of brushes of a motor-driven floor polisher having a base which is essentially triangular in shape, as shown and described, for example, in Engberg et al. United States Patent No. 1,901,497. In the aforementioned Engberg et al. patent three brushes are provided, one of which is rotatable in the opposite direction from the other two brushes.

When the brush cleaning device shown in the drawing and just described is being employed to clean the bristles of brushes of a floor polisher, the latter may be positioned in the base or vessel 10 with the brushes resting on the platform 17, as indicated in dotted lines at 26 in Fig. 1. With the base or vessel 10 held stationary in any suitable manner, the brushes 26 are rotated over the notched tabs 21 and 22, thus subjecting the brushes to a combing action and removing therefrom foreign matter such as wax and dirt, for example. Foreign matter removed from the brushes being cleaned can either pass through the slots 23 and 24 into the bottom of the base or vessel 10 or be thrown out by centrifugal force into the trough 20 where it is collected.

In Fig. 3 I have illustrated a modification of the invention which is generally like that shown in Figs. 1 and 2 and just described and also includes a number of spaced apart brackets 28 which are provided at the side wall 12' of a base 10' and extend inwardly therefrom to support the base 27' of a floor polishing machine at the vicinity of the peripheral edge thereof. The brackets 28 support the dead-weight load of the floor polishing machine within the base 10' and hold the brush or brushes 26' spaced from the platform 17' while in intimate physical contact with the notched tabs or combs, one of which is shown at 21a. The flange 19' may be formed with spaced apart gaps, one of which is shown at 19a in Fig. 3, so that the inner tray or pan 16' can be moved into and from the base 10' past the brackets 28.

By having the dead-weight load of the floor polishing machine supported on the brackets 28 when the brush or brushes 26' are being driven, the cleaning of the brush or brushes by the combs on the platform 17' is facilitated.

In view of the foregoing, it will now be understood that in both of the embodiments illustrated and just described, the brush cleaning device is so constructed and arranged that the brush supporting means offers negligible resistance to movement of the bristles during rotation thereof and that the notched combs or cleaning members 21 and 21a in Figs. 1 and 3, respectively, offer the predominant part of the resistance to movement of the bristles to promote effective cleaning of the brush. In the embodiment of Figs. 1 and 2, the platform or flat plate 17, at least a major portion of which is imperforate, essentially provides a surface which offers negligible resistance to movement of the bristles compared to that offered by the combs or cleaning members 21. In the embodiment of Fig. 3, the dead-weight load of the floor polisher is transmitted directly to the side wall 12' of the base 10' at the region 28. With this arrangement the brush supporting means offers negligible resistance to movement of the bristles due to the fact that the bristles are held out of direct physical contact with the platform or plate 17′ upon which the combs or cleaning members 21a are carried.

In both embodiments the supporting means for the brush and the cleaning members 21 and 21a, which are perpendicular to the path of movement of the brush bristles, are so constructed and arranged that the motor-driven rotatable brush can attain a speed of rotation which renders the combs or cleaning members 21 and 21a most effective for cleaning the bristles and causing the dirt removed therefrom to be thrown by centrifugal force into the dirt collecting trough 20 of annular form which extends downwardly from the platform 17 to the bottom 11 of the base 10.

Although I have shown and described several embodiments of my invention, I do not desire my invention to be limited to the particular arrangements set forth, and I intend in the claims to cover all modifications which do not depart from the spirit and scope of the invention.

What is claimed is:

1. A device for cleaning the bristles of a rotatable brush comprising a base which includes structure for supporting the brush in an upright position with the lower ends of the downwardly projecting bristles movable in a horizontal plane perpendicular to the axis of rotation of the brush, said base including a bottom and an upstanding side wall and an inverted pan positioned at the bottom of said base, said pan having a bottom and a side wall extending downwardly therefrom, the bottom of said pan providing a raised platform in said base, means projecting radially outward from the side wall of said inverted pan to the side wall of said base for positioning said pan at the bottom of said base, the side walls of said pan and said base forming the opposing sides of a trough of annular form which extends downwardly from said platform to the bottom of said base, spaced vertically disposed cleaning members projecting upwardly from said platform, said cleaning members being substantially perpendicular to and in the path of movement of the bristles, and said base being so constructed and arranged that said brush supporting structure offers negligible resistance to movement of the bristles during rotation thereof and said cleaning members offer the predominant part of the resistance to movement of the bristles to promote effective cleaning of the brush.

2. A device as set forth in claim 1 in which said brush supporting structure comprises the raised platform upon which the bristles of the brush are adapted to rest.

3. A device as set forth in claim 1 in which said brush supporting structure is so constructed and arranged that the brush bristles are out of direct physical contact with said raised platform when the brush is being cleaned.

4. A device for cleaning the bristles of a motor-driven rotatable brush comprising a base having a bottom and upstanding side wall, a flat plate for supporting the brush in an upright position with the lower ends of the downwardly projecting bristles resting on said plate and movable in a horizontal plane perpendicular to the axis of rotation of the brush, spaced vertically disposed cleaning members projecting upwardly from said plate which are substantially perpendicular thereto and in the path of movement of the bristles, means for holding said flat plate and said cleaning members thereon over the bottom of said base in spaced relation therewith and below the top edge of the side wall thereof, said plate holding means having structure associated therewith to position said plate within said base to provide a dirt collecting receptacle of which at least a part thereof is disposed about said plate and extends downwardly therefrom to the bottom of said base, the upstanding side wall of said base forming the outer wall of said receptacle, and said flat plate and said cleaning members being so constructed and formed that said plate offers negligible resistance to movement of the bristles resting thereon during rotation of the brush and the motor-driven rotatable brush can attain a speed of rotation which renders said cleaning members effective for cleaning the brush and causing the dirt removed therefrom to be thrown by centrifugal force into said dirt collecting receptacle disposed about and extending downwardly from said plate.

5. A device for cleaning the bristles of a plurality of motor-driven rotatable brushes comprising a base having a bottom and upstanding side wall, a flat plate for supporting the brushes in an upright position with the lower ends of the downwardly projecting bristles adapted to rest on said plate and move in a horizontal plane perpendicular to the axes of rotation of the brushes, spaced vertically disposed cleaning members projecting upwardly from said plate which are substantially perpendicular thereto and in the paths of movement of the bristles, means for holding said flat plate and cleaning members thereon over the bottom of said base in spaced relation therewith and below the top edge of the side wall thereof, said plate holding means and said base being constructed and arranged to position said plate within said base to provide a dirt collecting receptacle whose outer configuration is defined by said base and which extends downward from said plate to the bottom of said base, said cleaning members being distributed in a plurality of zones on said plate at which the bristles are adapted to rest during rotation of the brushes, said cleaning members being substantially straight and extending radially outward from the center regions of said zones, and said plate and cleaning members being so constructed and formed that said plate offers negligible resistance to movement of the bristles adapted to rest thereon during rotation of the brushes and the motor-driven rotatable brushes can attain speeds of rotation which render said cleaning members effective for cleaning the brushes.

6. A device for cleaning the bristles of a plurality of motor-driven rotatable brushes comprising a base having a bottom and upstanding side wall, a flat plate for supporting the brushes in an upright position with the lower ends of the downwardly projecting bristles adapted to rest on said plate and move in a horizontal plane perpendicular to the axes of rotation of the brushes, spaced vertically disposed cleaning members projecting upwardly from said plate which are substantially perpendicular thereto and in the paths of movement of the bristles, means for holding said flat plate and cleaning members thereon over the bottom of said base in spaced relation therewith and below the top edge of the side wall thereof, said plate holding means having structure associated therewith to position said plate within said base to provide a dirt collecting receptacle of which at least a part thereof is disposed about said plate and extends downward therefrom to the bottom of said base, said cleaning members being distributed in a plurality of zones on said plate at which the bristles are adapted to rest during rotation of the brushes, said cleaning members being substantially straight and extending radially outward from the center regions of said zones, and said plate and cleaning members being so constructed and formed that said plate offers negligible resistance to movement of the bristles adapted to rest thereon during rotation of the brushes and the motor-driven rotatable brushes can attain speeds of rotation which render said cleaning members effective for cleaning the brushes.

7. A device as set forth in claim 6 which includes an inverted pan positioned at the bottom of said base, said pan having a bottom and a side wall means extending downwardly therefrom, and means projecting outward from the side wall means of said inverted pan to the side wall of said base to position said pan at the bottom of said base, the bottom of said pan forming said flat plate from which said cleaning members project vertically upward, the side wall means of said pan forming said plate holding means, and said means projecting outward from the side wall means of said pan forming said structure associated with said pan to position said plate within said base to provide said dirt collecting receptacle which is disposed about said plate and in the form of an annular trough extending downward from the bottom of said inverted pan to the bottom of said base.

8. A device for cleaning the bristles of a motor-driven rotatable brush comprising a base having a bottom and upstanding side wall, a flat plate for supporting the brush in an upright position with the lower ends of the downwardly projecting bristles adapted to rest on said plate and move in a horizontal plane perpendicular to the axis of rotation of the brush, spaced vertically disposed cleaning members projecting upwardly from said plate which are substantially perpendicular thereto and in the path of movement of the bristles, means for holding said flat plate and said cleaning members thereon over the bottom of said base in spaced relation therewith and below the top edge of the side wall thereof, said plate holding means and said base being constructed and arranged to position said plate within said base to provide a dirt collecting receptacle whose outer configuration is defined by said base and which extends downward from said plate to the bottom of said base, and said flat plate and said cleaning members being so constructed and formed that said plate offers negligible resistance to movement of the bristles resting thereon during rotation of the brush and the motor-driven rotatable brush can attain a speed of rotation which renders said cleaning members effective for cleaning the brush and causing the dirt removed therefrom to be discharged into said dirt collecting receptacle extending downwardly from said plate.

References Cited in the file of this patent

UNITED STATES PATENTS

| | | |
|---|---|---|
| 531,412 | Garvey | Dec. 25, 1894 |
| 883,752 | Spicer | Apr. 7, 1908 |
| 1,253,264 | McKay | Jan. 15, 1918 |
| 1,553,023 | Bonnell | Sept. 8, 1925 |
| 1,572,102 | Braunsdorf | Feb. 9, 1926 |
| 2,159,176 | Nelson | May 23, 1941 |
| 2,170,528 | Gibbons | Aug. 22, 1939 |
| 2,197,869 | Kramer | Apr. 23, 1940 |
| 2,229,518 | Parker | Jan. 21, 1941 |
| 2,787,015 | Flam | Apr. 2, 1957 |

FOREIGN PATENTS

| | | |
|---|---|---|
| 235,951 | Great Britain | June 25, 1925 |
| 489,518 | France | Oct. 8, 1918 |
| 708,418 | Great Britain | May 5, 1954 |